US007952592B2

United States Patent
Burns et al.

(10) Patent No.: US 7,952,592 B2
(45) Date of Patent: May 31, 2011

(54) SYSTEM AND METHOD FOR VIEW-DEPENDENT CUTOUT GEOMETRY FOR IMPORTANCE-DRIVEN VOLUME RENDERING

(75) Inventors: Michael Burns, Princeton, NJ (US);
Klaus Engel, Donauwörth (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 932 days.

(21) Appl. No.: 11/852,407

(22) Filed: Sep. 10, 2007

(65) Prior Publication Data
US 2008/0079722 A1    Apr. 3, 2008

Related U.S. Application Data

(60) Provisional application No. 60/847,044, filed on Sep. 25, 2006.

(51) Int. Cl.
G09G 5/00 (2006.01)
(52) U.S. Cl. ........ 345/624; 345/421; 345/424; 345/620; 345/623; 382/128
(58) Field of Classification Search ............ 382/128, 382/120; 345/645
See application file for complete search history.

(56) References Cited

U.S. PATENT DOCUMENTS

| | | | | |
|---|---|---|---|---|
| 5,455,896 A * | 10/1995 | Takamura | | 345/419 |
| 5,748,192 A * | 5/1998 | Lindholm | | 345/649 |
| 6,232,979 B1 * | 5/2001 | Shochet | | 345/419 |
| 6,690,371 B1 * | 2/2004 | Okerlund et al. | | 345/424 |
| 6,862,334 B2 * | 3/2005 | Van Liere et al. | | 378/4 |
| 7,369,691 B2 * | 5/2008 | Kondo et al. | | 382/128 |
| 2005/0110748 A1 * | 5/2005 | Boeing et al. | | 345/156 |
| 2005/0237336 A1 * | 10/2005 | Guhring et al. | | 345/582 |
| 2006/0078182 A1 * | 4/2006 | Zwirn et al. | | 382/128 |
| 2006/0229513 A1 * | 10/2006 | Wakai | | 600/407 |
| 2007/0046661 A1 * | 3/2007 | Ma et al. | | 345/419 |
| 2007/0046685 A1 * | 3/2007 | Lessieux | | 345/581 |
| 2007/0133845 A1 * | 6/2007 | Fradkin et al. | | 382/120 |

OTHER PUBLICATIONS

Weiskopf, D.; Engel, K.; Ertl, T.; , "Interactive clipping techniques for texture-based volume visualization and volume shading," Visualization and Computer Graphics, IEEE Transactions on , vol. 9, No. 3, pp. 298-312, Jul.-Sep. 2003.*
Wei, C.; Wei, H.; HuJun, B.; QunSheng, P.; , "Real-Time Ray Casting Rendering of Volume Clipping in Medical Visualization," Journal of Computer Science and Technology, vol. 18, No. 6, 804-814, Nov. 2003.*
Ivan Viola, et al. "Importance-Driven Volume Rendering" in *VIS '04: Proceedings of the Conference on Visualization '04*, pp. 139-146, Washington, DC, USA, 2004. IEEE Computer Society.

(Continued)

*Primary Examiner* — Xiao M Wu
*Assistant Examiner* — Phi Hoang
(74) *Attorney, Agent, or Firm* — Donald B. Paschburg; F. Chau & Associates, LLC

(57) ABSTRACT

A method for creating a cutout surface for volume rendering includes providing a digitized medical image volume comprising a plurality of intensities corresponding to a 3-dimensional grid of points, identifying a surface of interest in said image volume, representing said surface-of-interest by a polygonal mesh, extracting a set of curves on said surface-of-interest where a cutout surface will intersect, extending a vector defined on one of said curves toward a viewing point, and sweeping said extended vector along said curve to create said cutout surface.

17 Claims, 5 Drawing Sheets

OTHER PUBLICATIONS

Aaron Hertzmann, et al., "Illustrating Smooth Surfaces," *In SIGGRAPH '00: Proceedings of the 27th Annual Conference on Computer Graphics and Interactive Techniques*, pp. 517-526, NY, NY USA, 2000, ACM Press/Addison-Wesley Publishing Co.

Michael Burns, et al., "Feature Emphasis and Contextual Cutaways for Multimodal Medical Visualization," Eurographics/IEEE-VGTC Symposium on Visualization (2007) Ken Museth, Torsten Moller, and Anders Ynnerman (Editors).

* cited by examiner

SYSTEM AND METHOD FOR VIEW-DEPENDENT CUTOUT GEOMETRY FOR IMPORTANCE-DRIVEN VOLUME RENDERING

CROSS REFERENCE TO RELATED UNITED STATES APPLICATIONS

This application claims priority from "Creating View-Dependent Cutout Geometry for Importance-Driven Volume Rendering", U.S. Provisional Application No. 60/847,044 of Burns, et al., filed Sep. 25, 2006, the contents of which are herein incorporated by reference.

TECHNICAL FIELD

This disclosure is directed to the visualization and volume rendering of digitized medical images.

DISCUSSION OF THE RELATED ART

One goal of medical imaging visualization is the visual accentuation of a segmented region of interest in a computed tomography (CT) or magnetic resonance image (MRI) volume. For example, one may wish to view segmented coronary arteries as they are embedded in the heart or to view segmented organs in relation to the torso. These segmentations can come as a result of manual or automatic processes, and are usually represented by a binary mask volume or a polygonal surface. When rendering the volume in which they lie, placing emphasis on segmented regions can be challenging using traditional rendering methods, as regions embedded in tissue and bone can be obscured by this material. The issue that interesting structures are partly or completely occluded by surrounding tissue is frequently encountered in volume visualization. This is challenging to resolve by traditional view independent approaches, such as transfer function specification.

The underlying principle of direct volume rendering is to sample a volume dataset along rays in an arbitrary direction and to blend these samples together in a frame buffer. Before being blended, the densities read in the volume are converted to colors (RGB) and opacities (alpha) with a transfer function that is often encoded as a lookup table. For this reason, the blending is often referred to as alpha-blending. When a sufficient quantity of samples are involved, the result is a seamless image.

There exist several techniques to reveal the inside of a volume. One option is to employ transfer functions, which map density values from the volume to color and opacities. By using very low or zero opacity for density values of occluding structures, these occluding structures can be made transparent or completely invisible in the resulting images. However, by removing occluding features using the transfer function, the context surrounding an important feature is lost. Moreover, other important features that have similar density values as occluding structures will also be removed.

Another common method to remove occluding material is to segment important features and avoid rendering fragments that are not within the segmented parts of the volume. Similar to transfer functions, the context surrounding the segmented feature is lost by using such a technique. In importance-driven visualization, material occluding an important feature that has been segmented is cut away during rendering. Often, however, it is necessary to browse a volume to search for an important feature that has not yet been segmented. Consequently, importance-driven visualization cannot be applied in this case.

Clipping planes are another common approach to reveal features embedded inside a volume data set. All fragments in one of the two half-spaces defined by the clipping plane are removed. Clip geometries extend the idea of clipping planes by facilitating removal of the inside or the outside of a given arbitrary geometry.

Recently, research has been performed on importance-driven volume rendering, where a volume is carved away in front of a region of interest to reveal the region and how it is positioned relative to its surroundings. FIGS. 1(a)-(b) contrast traditional volume rendering with importance-driven volume rendering. Traditional volume rendering, illustrated in FIG. 1(a), can leave objects of interest 10 obscured by surrounding materials 11. Importance-driven volume rendering, illustrated in FIG. 1(b), aims to expose objects of interest 10 by using a view-dependent cutaway 12. The published methods for importance-driven volume rendering rely on signal processing techniques of a projected depth map of the region of interest to create an extruded depth buffer to be used in volume rendering.

Traditionally objects within the volume dataset are classified by optical properties like color and opacity. Importance-drive n volume rendering assigns objects another dimension, which describes their importance. Importance encodes which objects are the most interesting ones and have the highest priority to be clearly visible. Each object is therefore weighted by a positive scalar value called object importance. Object importance describes the visibility priority of each object within the volume dataset. It is a positive scalar value, which is constant for the whole object. During the rendering stage, the visibility of each object is evaluated according to its importance. If less important objects are occluding features that are more interesting, the less important ones are rendered more sparsely, e.g., more transparently. If the same object does not cause any unwanted occlusions in other regions of the image, it is rendered more densely, e.g., opaque, in order to see its features more clearly. This enables all interesting structures to be seen whether or not they are occluded, while the less important parts are still visible as much as possible.

Instead of using constant optical characteristics, which are independent from the viewpoint, several levels of sparseness are used for each object. The levels of sparseness are different representations of a particular object from the most dense to the most sparse one. Several optical characteristics are assigned with smooth transitions in between. These multiple levels of sparseness allow the object to continuously change its visual appearance from a very dense representation to a very sparse one. Which level of sparseness will be chosen is dependent on the importance of the particular object and the importance of hidden objects behind. The level of sparseness thus may continuously vary within a single object. Sparseness is defined in terms of how much the display of an object takes up screen estate. For an iso-surface, a point-cloud or a wireframe display is a very sparse representation. The display of filled opaque polygons is a very dense representation of the same isosurface. The sparseness can modulate the opacity of object samples so that the most interesting samples are opaque while other samples are more transparent. Also, depending on the viewpoint, the same part of an object may be represented with different levels of sparseness.

To determine the sparseness level for each object or parts thereof the rendering pipeline requires an additional step, referred to as importance compositing. Instead of compositing optical properties, the object importance values are accumulated. This step evaluates the occlusion, takes the importance factor of each object into account and assigns to each object particular levels of sparseness. For each ray the compositing evaluates object occlusions and assigns the corresponding level of sparseness to each object. Object importance is mapped to object visibility in the result image. This causes different rendering settings for the context object in the area of the image which is covered by the focus object. Importance-driven rendering assigns a higher sparseness factor only to the area where occlusion occurs. The final synthesis results in images with maximal visual information with respect to the predefined object importance.

SUMMARY OF THE INVENTION

Exemplary embodiments of the invention as described herein generally include methods and systems for creating cutaway views using an extruded depth buffer by creating and rendering a geometric representation of the carved region. Once an extruded depth buffer is created with a cutout shape, we can use traditional slice-based hardware volume rendering in conjunction with hardware depth testing to create the final cutout effect. A method according to an embodiment of the invention assumes there is a region of interest in the volume and generates a view-dependent geometric cutout of the region of interest and uses this in conjunction with traditional hardware-based volume rendering methods to create images that expose the region of interest from all viewpoints.

According to an aspect of the invention, there is provided a method for creating a cutout surface for volume rendering, including providing a digitized medical image volume comprising a plurality of intensities corresponding to a 3-dimensional grid of points, identifying a surface of interest in said image volume, representing said surface-of-interest by a polygonal mesh, extracting a set of curves on said surface-of-interest where a cutout surface will intersect, extending a vector defined on one of said curves toward a viewing point, and sweeping said extended vector along said curve to create said cutout surface.

According to a further aspect of the invention, the cutout surface will intersect said surface-of-interest at an angle θ between the surface tangent and a vector from the surface to a viewing point.

According to a further aspect of the invention, the angle θ satisfies the relation $\hat{n} \cdot \hat{v} + \sin(\theta) = 0$, wherein $\hat{n}$ is a surface normal vector, $\hat{v}$ is a normalized view vector from the surface to the viewing point.

According to a further aspect of the invention, the curves extracted from said surface-of-interest are zero-sets of the function $L = \hat{n} \cdot \hat{v} + \sin(\theta)$.

According to a further aspect of the invention, extracting said set of curves includes computing, for each vertex p of the polygonal mesh, a true surface normal and function $g(p) = (n(p) \cdot v(p)) + \sin(\theta)$ at said vertex, interpolating values of said function $g(p)$, wherein a piecewise-linear is formed, arbitrarily selecting a sign of function $g(p)$ at vertices where it is zero, wherein resulting line segments connect points in an interior of edges of said mesh, and form a set of connected points.

According to a further aspect of the invention, the extended vector U satisfies the relationship $\vec{u} = |\vec{v}|\sin(\theta)\hat{n} + \vec{v}$.

According to a further aspect of the invention, the method includes, for each pair of adjacent points $p_a$ and $p_b$ in each loop of said curve, calculating $\vec{u}$ at both points and storing a quadrangle defined by $(p_a, p_a + \vec{u}(p_a), p_b + \vec{u}(p_b), p_b)$ in the cutout surface C; and creating said cutout surface as a surface of quadrangles by extruding points of said curve along said $\vec{u}$ vectors.

According to a further aspect of the invention, the method includes rendering said surface using a graphics processing unit (GPU), with color buffer writing disabled, depth buffer writing enabled, and the depth function GREATER wherein depth values farthest from the viewer are stored for overlapping surfaces, wherein said depth buffer is used when rendering the volume to prevent rendering of the cutout area.

According to another aspect of the invention, there is provided a program storage device readable by a computer, tangibly embodying a program of instructions executable by the computer to perform the method steps for creating a cutout surface for volume rendering.

DETAILED DESCRIPTION OF EXEMPLARY EMBODIMENTS

Figure 1:
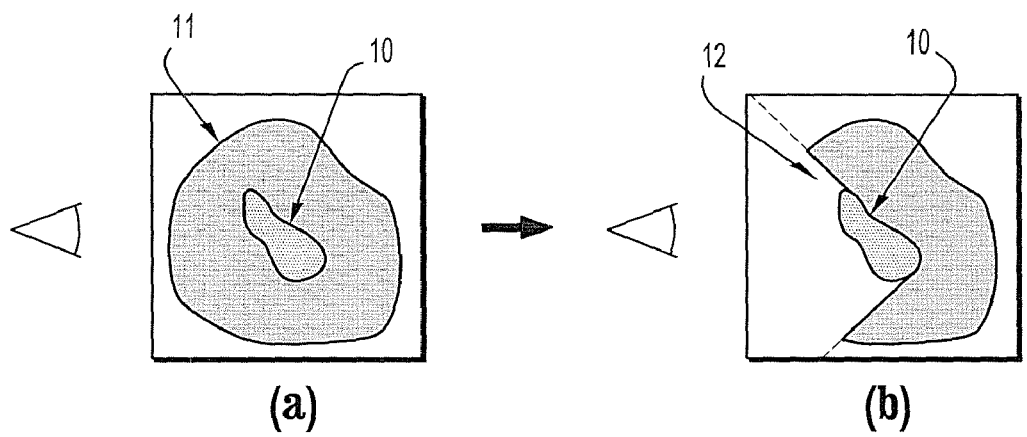
FIGS. 1(a)-(b) contrast traditional volume rendering with importance-driven volume rendering, according to an embodiment of the invention.

Exemplary embodiments of the invention as described herein generally include systems and methods for creating a cutout geometry for importance-driven volume rendering. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

An object of interest within a volume can be occluded by particular materials within the volume. However, the object can be presented in such a way that the material around it is cutaway based on the importance of the material. A simple cutaway view partitions space into two distinct regions: the area inside the cutaway, denoted as the clear region, and everything else, which is denoted as the base. An occlusion function, denoted $\Omega$, represents the degree to which a point in space occludes the object of interest. In the simple cutaway scenario, at a given point, $\Omega=1$ if the point is inside the clear region and 0 if it is inside the base region. In the space of a viewer, a cutaway surface can be represented by a depth function $\xi(\theta)=z$, where z is the depth of the cutaway surface with angle $\theta$ at a given point projected onto the surface. The occlusion function $\Omega$ can then be defined for a given point in viewer space according to $\Omega=\text{step}(\xi(\theta), p_z)$, where $p_z$ is the z component of the point and $\text{step}(a, x)=0$ if $x<a$ and 1 if $x \geq a$. This binary definition suggests rendering can have only two modes: spare (for the clear region) and dense (for the base region). However, to give more control over the rendering of materials with multiple importance values, an improved cutaway can have occlusion values that vary smoothly between 0 and 1 over 3D space. Occlusion functions are disclosed in assignee's co-pending patent application "Feature Emphasis and Contextual Cutaways for Image Visualization", Siemens Docket No. 2007P00178US, filed concurrently, the contents of which are herein incorporated by reference in their entirety.

A simple cutaway definition can be modified to include a second cutaway surface, which is defined by a wider angle. This new region between the angles is denoted as the transition region. The transition region can have an occlusion function $\Omega$ that varies between the two cutout surfaces. Another region, denoted as the overlay region, is added to control the visibility in the image over the object of interest. The overlay region is bounded by the cutaway surface of $\theta_1$ offset a thickness d towards a camera viewing the volume a viewing direction v.

Considering these four regions (i.e., the clear, base, transition, and overlay regions), an occlusion function $\Omega$ for a given point in eye space can be defined according to the following equation:

$$\Omega = \frac{\text{ramp}(\xi(\theta_2), \xi(\theta_1), p_z) + \text{ramp}(\xi(\theta_2), \xi(\theta_1) + d, p_z)}{2}$$

where $\theta_1$ and $\theta_2$ are the cutaway angles, d is the thickness of the overlay region, $\text{ramp}(a,b,x)=0$ if $x<a$ and 1 if $x>b$, and the ramp is a linear ramp from 0 to 1 for $a \leq x \leq b$. This equation results in $\Omega=0$ for points in the bases area, $\Omega=0.5$ for points on the transition-overlay boundary, and $\Omega=1$ for points in the clear area, with the appropriate linear blends for points in between the boundaries.

Figure 2:
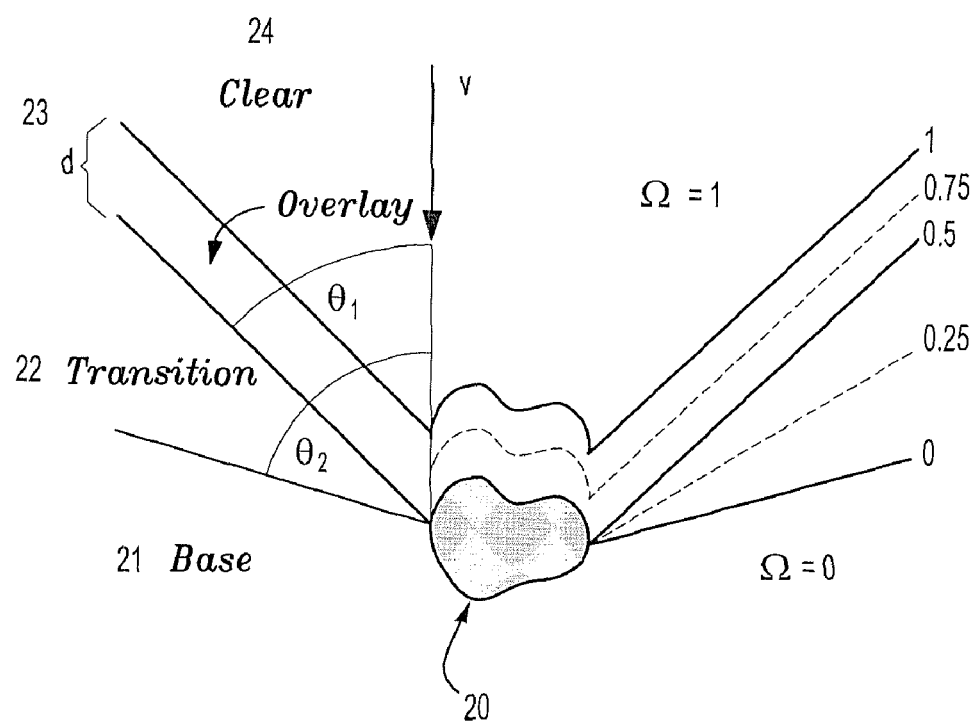
FIG. 2 is a cross-sectional view of an object of interest, a viewing direction and contextual cutaways regions according to an embodiment of the present invention.

FIG. 2 is a cross-sectional view of an object of interest 20, a viewing direction v, and contextual cutaways regions according to an exemplary embodiment of the present invention. FIG. 2 illustrates a cutaway with a base 21, transition 22, overlay 23, and clear region 24. The occlusion function $\Omega$ has a value of 1 in the clear region and 0 in the base region. In a traditional cutaway, $\theta_1=\theta_2$ and $d=0$.

Given a surface of interest S in an image volume that is to be visualized, it is desired to create a view-dependent cutout surface C oriented towards a camera outside the volume. The surface C should cut into the volumetric material surrounding and occluding S, the object of interest. The primary parameter of this surface is $\theta$, the angle between the cutout surface and the view vector $\vec{v}$ to the camera/viewer. The angle $\theta$ should be in the range [0, 90°), with larger values of $\theta$ creating a wider cutout.

Figure 4:
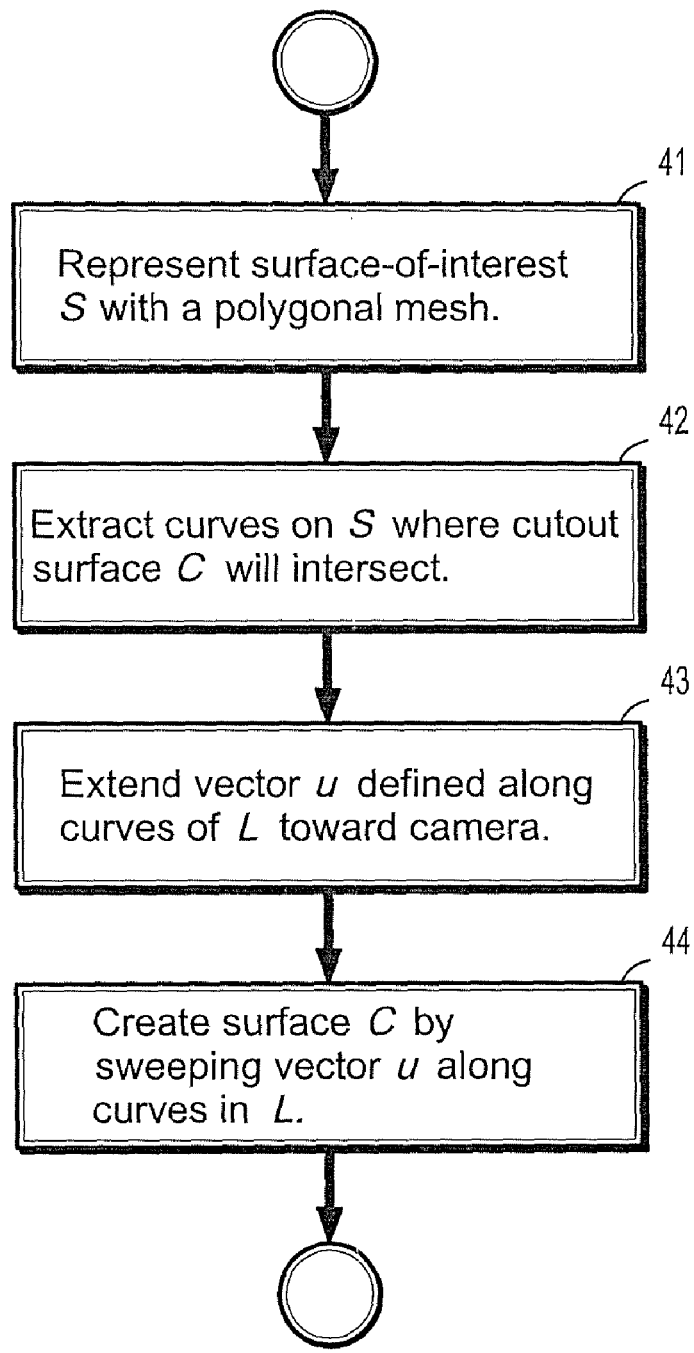
FIG. 4 is a flowchart of an algorithm for creating a cutout geometry for importance-driven volume rendering, according to an embodiment of the invention.

A flowchart of an algorithm for creating a cutout geometry for importance-driven volume rendering is shown in FIG. 4. Referring to the figure, a method according to an embodiment of the invention for constructing a cutout geometry begins at step 41 by representing the surface S by a polygonal mesh, typically extracted from a binary mask volume. At step 42, a set of curves is extracted on the surface S where contact is to be made between the surface C and the surface S. The set of curves is what will define half of C, and is where S and C will join. Since C has yet to be generated, at this point only S exists. This contact should be made where the angle between the surface S and the vector $\vec{v}$ is $\theta$, which occurs when $\hat{n} \cdot \hat{v} = \cos(\theta+90°) = -\sin(\theta)$, where $\hat{n}$ is the surface normal, and $\vec{v}$ is the normalized view vector from the surface to the camera. Thus, these curves can be defined as the zero set of the function $L = \hat{n} \cdot \hat{v} + \sin(\theta)$. On a closed surface, these curves will include one or more loops.

According to an embodiment of the invention, in order to extract the curves of L, a standard contour extraction algorithm for meshes is used, modifying the $\hat{n} \cdot \hat{v} = 0$ test to $\hat{n} \cdot \hat{v} + \sin(\theta) = 0$. The curve set for a smooth surface is the set of points p of the surface such that $(n(p) \cdot v(p)) + \sin(\theta) = 0$, where n(p) is the normal to the surface at point p. In the case of orthographic projection, v(p) is the global normalized viewing direction. In the case of perspective projection, v(p) is the normalized vector from p to the camera position e, $|(e-p)|$. More generally, the silhouette set of a surface is the zero set of the function $g(p) = (n(p) \cdot v(p)) + \sin(\theta)$ defined on the surface. The idea is to compute an approximation to this function and find its zero set. For each vertex p of the polygonal approximation, compute the true surface normal and g(p) at the vertex. Then the approximation to the function g(p) is defined by linear interpolation of the values of the function. As the resulting function is piecewise-linear, the zero set will consist of line segments inside each triangle of the polygonal approximation. The sign of the function g(p) can be picked arbitrarily at vertices where it happens to be exactly zero. As a result, the line segments of the zero set connect points in the interior of the edges of the mesh, and form either closed loops or non-intersecting chains connecting points on the feature lines, similar in structure to the actual silhouette curves. This results in a set of connected points on L.

Figure 3:
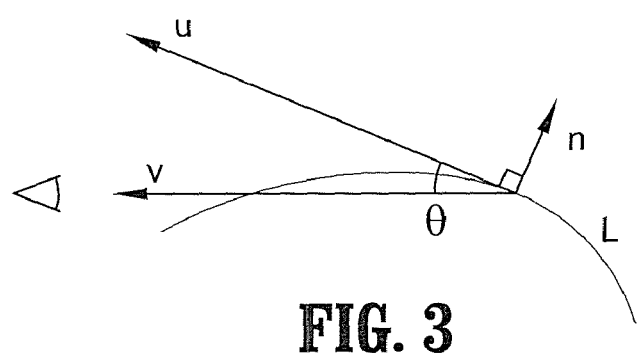
FIG. 3 depicts a level curve and a cutaway surface defining vector, according to an embodiment of the invention.

According to an embodiment of the invention, the cutout geometry is formed at step 43 by extending a vector defined along the curves in L outward towards the camera. Consider a point p on a curve in L. At the point p, which lies on the surface S, there is the surface normal $\hat{n}$, and the view vector $\vec{v}$. In the case of orthographic projection, the view vector $\vec{v}$ is a global parameter dependent on the camera position and independent of p. In the case of perspective projection, the view vector $\vec{v} = e - p$, where e is the location of the eye or camera. It is desired to calculate a vector $\vec{u}$ that lies in the plane spanned by $\hat{n}$ and $\vec{v}$ where the angle between $\vec{u}$ and $\vec{v}$ is $\theta$. From trigonometric considerations it can be determined that this vector is $\vec{u}=|\vec{v}|\sin(\theta)\hat{n}+\vec{v}$. FIG. 3 illustrates a curve L with a vector u, normal vector n, and viewing vector v.

For each pair of adjacent points $p_a$ and $p_b$ in each loop of L, one calculates $\vec{u}$ at both points and stores the quadrangle defined by $(p_a, p_a+\vec{u}(p_a), p_b+\vec{u}(p_b), p_b)$ in the surface C. Thus C is created as a surface of quadrangles by extruding the points of L along the $\vec{u}$ vectors.

Figure 6:
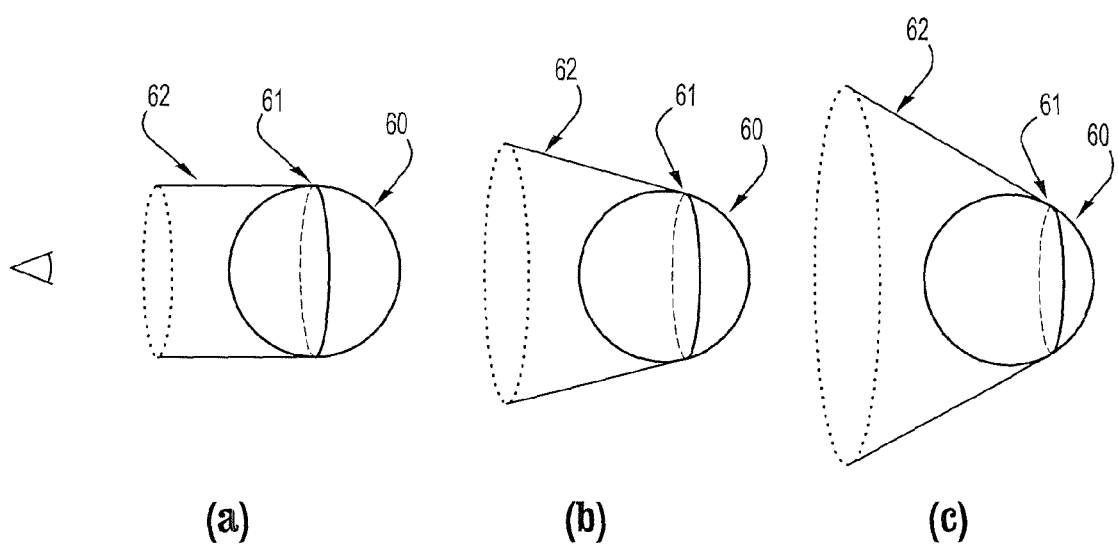
FIGS. 6(a)-(c) depicts 3 examples a sweeping vector creating the surface C, according to an embodiment of the invention.

Finally, referring again to FIG. 4, at step 44, the surface C is created by sweeping $\vec{u}$ along the curves in L. FIGS. 6(a)-(c) depicts 3 examples a sweeping vector $\vec{u}$ creating the surface C, according to an embodiment of the invention. In each of the three figures, the surface to be visualized, S, is indicated by reference number 60, the intersection curve by reference number 61, and the cutaway surface C being swept out by vector $\vec{u}$ by reference number 62. FIG. 6(a) shows the surface C 62 for an angle $\theta=0$ degrees, FIG. 6(b) shows the surface C 61 for an angle $\theta=15$ degrees, and FIG. 6(c) shows the surface C 61 for an angle $\theta=30$ degrees.

This surface C can be rendered using OpenGL in conjunction with a graphics processing unit (GPU), with color buffer writing disabled, depth buffer writing enabled, and the depth function GREATER so that the depth values farthest from the viewer are stored, in the case of overlapping surfaces. This depth buffer is then used when rendering the volume to prevent rendering of the cutout area.

Although a method for creating a view-dependent cutout surface according to an embodiment of the invention has been described for a case of one cutout surface intersecting an object-of-interest, methods of other embodiments are not so limited. For example, a method according to another embodiment of the invention can be applied to the situation depicted in FIG. 2, in which there is a second surface used to define an transition region in the occlusion function.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
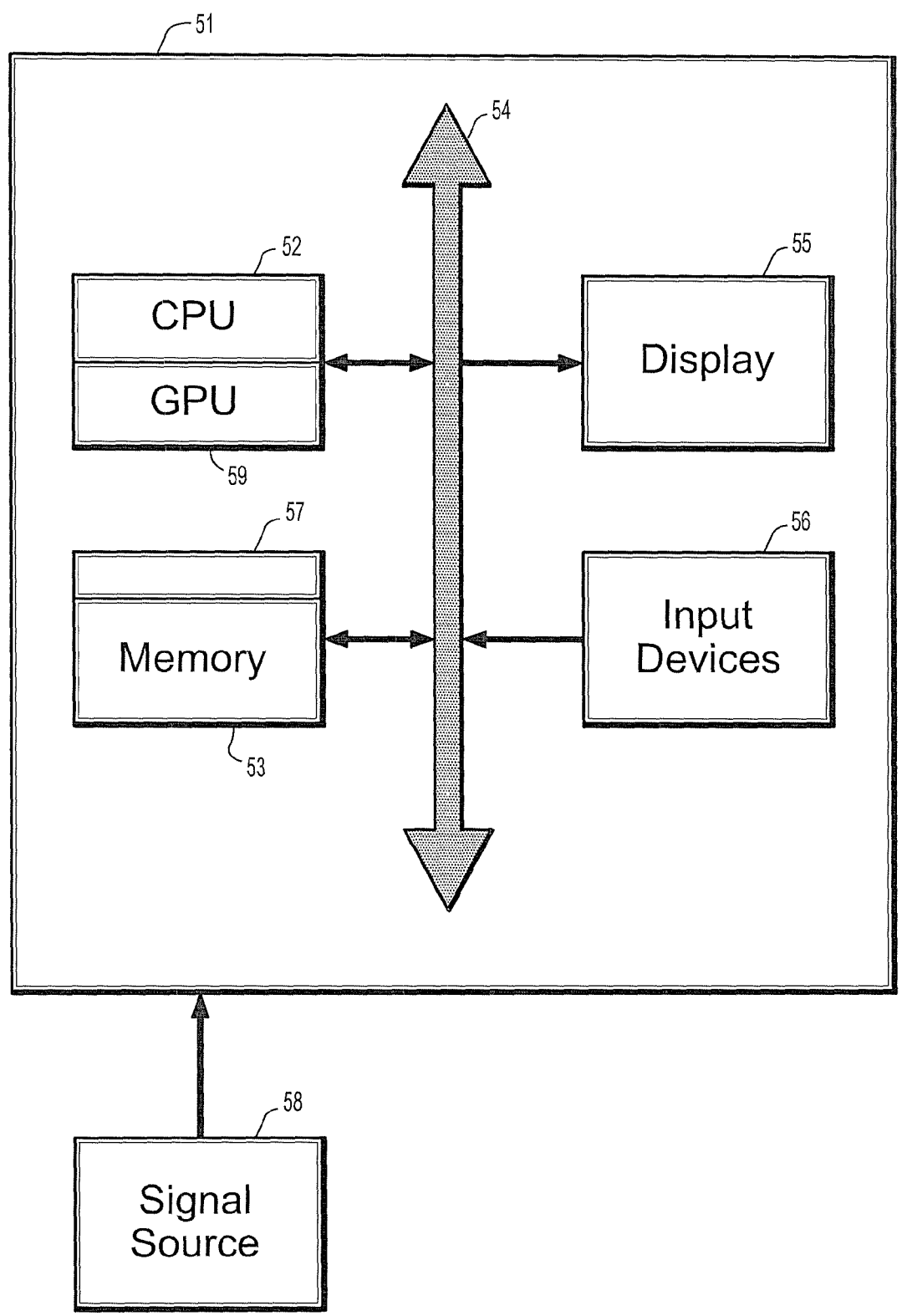
FIG. 5 is a block diagram of an exemplary computer system for implementing a method for creating a cutout geometry for importance-driven volume renderings, according to an embodiment of the invention.

FIG. 5 is a block diagram of an exemplary computer system for implementing a method for creating a cutout geometry for importance-driven volume rendering, according to an embodiment of the invention. Referring now to FIG. 5, a computer system 51 for implementing the present invention can comprise, inter alia, a central processing unit (CPU) 52, a graphics processing unit (GPU) 59, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 or GPU 59 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented method for creating a cutout surface for volume rendering, the method performed by the computer comprising the steps of:
   providing a digitized medical image volume comprising a plurality of intensities corresponding to a 3-dimensional grid of points;
   identifying, by the computer, a surface of interest in said image volume;
   representing said surface-of-interest by a polygonal mesh;
   extracting a set of curves on said surface-of-interest where a cutout surface will intersect;
   extending a vector defined on one of said curves toward a viewing point; and
   sweeping said extended vector along said curve to create said cutout surface, wherein said cutout surface will intersect said surface-of-interest at an angle $\theta$ between the surface tangent and a vector from the surface to a viewing point, and said angle $\theta$ satisfies the relation $\hat{n}\cdot\hat{v}+\sin(\theta)=0$, wherein $\hat{n}$ is a surface normal vector, $\hat{v}$ is a normalized view vector from the surface to the viewing point.

2. The method of claim 1, wherein said curves extracted from said surface-of-interest are zero-sets of the function $L=\hat{n}\cdot\hat{v}+\sin(\theta)$.

3. The method of claim 1, wherein extracting said set of curves comprises:
   computing, for each vertex p of the polygonal mesh, a true surface normal and function $g(p)=(n(p)\cdot v(p))+\sin(\theta)$ at said vertex;
   interpolating values of said function $g(p)$, wherein a piecewise-linear is formed;
   arbitrarily selecting a sign of function $g(p)$ at vertices where it is zero, wherein resulting line segments connect points in an interior of edges of said mesh, and form a set of connected points.

4. The method of claim 1, wherein said extended vector $\vec{u}$ a satisfies the relationship $\vec{u}=|\vec{v}|\sin(\theta)\hat{n}+\vec{v}$.

5. The method of claim 4, comprising, for each pair of adjacent points $p_a$ and $p_b$ in each loop of said curve, calculating $\vec{u}$ at both points and storing a quadrangle defined by $(p_a, p_a+\vec{u}(p_a), p_b+\vec{u}(p_b), p_b)$ in the cutout surface C; and creating said cutout surface as a surface of quadrangles by extruding points of said curve along said a vectors.

6. The method of claim 1, further comprising rendering said surface using a graphics processing unit (GPU) with an OpenGL graphics library, with color buffer writing disabled, depth buffer writing enabled, and the depth function argument is GREATER, wherein depth values farthest from the viewer are stored for overlapping surfaces, and said depth buffer is used when rendering the volume to prevent rendering of the cutout area.

7. A computer-implemented method for creating a cutout surface for volume rendering, the method performed bathe computer comprising the steps of:
    identifying, by the computer, a surface of interest in a digitized medical image volume;
    finding a curve on said surface-of-interest where a cutout surface will intersect, wherein said cutout surface intersects said surface-of-interest at an angle $\theta$ between the surface tangent and a vector from the surface to a viewing point, wherein said angle $\theta$ satisfies the relation $\hat{n}\cdot\hat{v}+\sin(\theta)=0$, wherein $\hat{n}$ is a surface normal vector, $\hat{v}$ is a normalized view vector from the surface to the viewing point;
    extending a vector $\vec{u}$ a defined on said curve toward a viewing point, wherein vector $\vec{u}$ satisfies the relationship $\vec{u}=|\vec{v}|\sin(\theta)\hat{n}+\vec{v}$; and
    sweeping said extended vector along said curve to create said cutout surface.

8. The method of claim 7, wherein said image comprises a plurality of intensities corresponding to a 3-dimensional grid of points.

9. The method of claim 7, further comprising representing said surface-of-interest by a polygonal mesh.

10. The method of claim 9, wherein said intersection curve on said surface-of-interest is a zero-set of the function $L=\hat{n}\cdot\hat{v}+\sin(\theta)$.

11. The method of claim 10, wherein finding said intersection curve comprises:
    computing, for each vertex p of the polygonal mesh, a true surface normal and function $g(p)=(n(p)\cdot v(p))+\sin(\theta)$ at said vertex;
    interpolating values of said function $g(p)$, wherein a piecewise-linear is formed;
    arbitrarily selecting a sign of function $g(p)$ at vertices where it is zero, wherein resulting line segments connect points in an interior of edges of said mesh, and form a set of connected points.

12. A non-transitory program storage device readable by a computer, tangibly embodying a program of instructions executable by the computer to perform the method steps for creating a cutout surface for volume rendering, said method comprising the steps of:
    providing a digitized medical image volume comprising a plurality of intensities corresponding to a 3-dimensional grid of points;
    identifying a surface of interest in said image volume;
    representing said surface-of-interest by a polygonal mesh;
    extracting a set of curves on said surface-of-interest where a cutout surface will intersect:
    extending a vector defined on one of said curves toward a viewing point; and
    sweeping said extended vector along said curve to create said cutout surface, wherein said cutout surface will intersect said surface-of-interest at an angle $\theta$ between the surface tangent and a vector from the surface to a viewing point, and said angle $\theta$ satisfies the relation $\hat{n}\cdot\hat{v}+\sin(\theta)=0$, wherein $\hat{n}$ is a surface normal vector, $\hat{v}$ is a normalized view vector from the surface to the viewing point.

13. The computer readable program storage device of claim 12, wherein said curves extracted from said surface-of-interest are zero-sets of the function $L=\hat{n}\cdot\hat{v}+\sin(\theta)$.

14. The computer readable program storage device of claim 12, wherein extracting said set of curves comprises:
    computing, for each vertex p of the polygonal mesh, a true surface normal and function $g(p)=(n(p)\cdot v(p))+\sin(\theta)$ at said vertex;
    interpolating values of said function $g(p)$, wherein a piecewise-linear is formed;
    arbitrarily selecting a sign of function $g(p)$ at vertices where it is zero, wherein resulting line segments connect points in an interior of edges of said mesh, and form a set of connected points.

15. The computer readable program storage device of claim 12, wherein said extended vector $\vec{u}$ satisfies the relationship $\vec{u}=|\vec{v}|\sin(\theta)\hat{n}+\vec{v}$.

16. The computer readable program storage device of claim 15, the method further comprising, for each pair of adjacent points $p_a$ and $p_b$ in each loop of said curve, calculating $\vec{u}$ at both points and storing a quadrangle defined by ($p_a$, $p_a+\vec{u}(p_a)$, $p_b+\vec{u}(p_b)$, $p_b$) in the cutout surface C; and creating said cutout surface as a surface of quadrangles by extruding points of said curve along said $\vec{u}$ vectors.

17. The computer readable program storage device of claim 14, the method further comprising rendering said surface using a graphics processing unit (GPU) with an OpenGL graphics library, with color buffer writing disabled, depth buffer writing enabled, and the depth function argument is GREATER, wherein depth values farthest from the viewer are stored for overlapping surfaces, and said depth buffer is used when rendering the volume to prevent rendering of the cutout area.

* * * * *